(12) United States Patent
Hu et al.

(10) Patent No.: US 9,643,741 B2
(45) Date of Patent: May 9, 2017

(54) HYDRAULIC ACCUMULATOR FOR PROPELLANT TANK IN SPACECRAFT

(71) Applicant: BEIJING INSTITUTE OF CONTROL ENGINEERING, Beijing (CN)

(72) Inventors: Qi Hu, Beijing (CN); Yong Li, Beijing (CN); Hailin Pan, Beijing (CN); Jian Chen, Beijing (CN); Yanming Wei, Beijing (CN); Baotang Zhuang, Beijing (CN); Jintao Liu, Beijing (CN)

(73) Assignee: BEIJING INSTITUTE OF CONTROL ENGINEERING, Beijing (CN)

( * ) Notice: Subject to any disclaimer, the term of this patent is extended or adjusted under 35 U.S.C. 154(b) by 0 days.

(21) Appl. No.: 15/023,266

(22) PCT Filed: May 20, 2014

(86) PCT No.: PCT/CN2014/077866
§ 371 (c)(1),
(2) Date: Mar. 18, 2016

(87) PCT Pub. No.: WO2015/165133
PCT Pub. Date: Nov. 5, 2015

(65) Prior Publication Data
US 2016/0311559 A1     Oct. 27, 2016

(30) Foreign Application Priority Data

Apr. 29, 2014  (CN) .......................... 2014 1 0178837

(51) Int. Cl.
*B64G 1/40*     (2006.01)
*F02K 9/60*     (2006.01)
*F17C 13/00*    (2006.01)

(52) U.S. Cl.
CPC .............. *B64G 1/402* (2013.01); *F02K 9/605* (2013.01); *F17C 13/008* (2013.01)

(58) Field of Classification Search
CPC ....... B64G 1/402; F02K 9/605; F17C 13/008; B64D 37/08; B64D 37/20
See application file for complete search history.

(56) References Cited

U.S. PATENT DOCUMENTS 4,553,565 A   11/1985  Kerebel
4,976,398 A   12/1990  Bruhn
(Continued)

FOREIGN PATENT DOCUMENTS

CN    201553157 U    8/2010
CN    102518939 A    6/2012
DE    10040755 A1    3/2002

OTHER PUBLICATIONS

International Search Report and Written Opinion of the ISA for PCT/CN2015/077866, ISA/CN, mailed Sep. 1, 2014.

*Primary Examiner* — Nicholas McFall
(74) *Attorney, Agent, or Firm* — Harness, Dickey & Pierce, P.L.C.

(57) ABSTRACT

A liquid storage device for a propellant tank in a spacecraft includes a gas-guide tube, a cover plate, a housing, blades, a supporting column, a base, a passage-window pressing plate, a passage-window mesh piece, a liquid-storage-device mesh piece, a fixing block, and a pressing plate for the liquid-storage-device mesh piece. The blades are uniformly distributed on and fixed to the support column in a radial direction to form an integral structure, and the integral structure is mounted on and fixed to a circular partition plate in the base. The liquid-storage-device mesh piece is pressed on the circular partition plate in the base by the pressing plate for the liquid-storage-device mesh piece and then is fixed. The passage-window mesh piece is pressed on the (Continued)

outer side of a cylinder wall of the base by the passage-window pressing plate and then is fixed.

12 Claims, 5 Drawing Sheets

(56) References Cited

U.S. PATENT DOCUMENTS

| | | | |
|---|---|---|---|
| 5,279,323 A | 1/1994 | Grove et al. | |
| 5,901,557 A * | 5/1999 | Grayson | F17C 1/00 62/45.1 |
| 2003/0056838 A1 | 3/2003 | Grayson | |

* cited by examiner

HYDRAULIC ACCUMULATOR FOR PROPELLANT TANK IN SPACECRAFT

CROSS REFERENCE TO RELATED APPLICATIONS

This application is the national phase of International Application No. PCT/CN2014/077866, titled "HYDRAULIC ACCUMULATOR FOR PROPELLANT TANK IN SPACECRAFT", filed on May 20, 2014, which claims the benefit of priority to Chinese Patent Application No. 201410178837.5 titled "LIQUID STORAGE DEVICE FOR PROPELLANT TANK OF SPACECRAFT", filed with the Chinese State Intellectual Property Office on Apr. 29, 2014, the entire disclosures of both applications are incorporated herein by reference.

TECHNICAL FIELD

The present application relates to a liquid storage device for fluid management in space environment, which is particularly applicable to a propellant tank in a spacecraft.

BACKGROUND

A propellant tank is widely used in various spacecrafts, such as a satellite, a spaceship, a space station, a carrier rocket, for its high reliability and long service life in the weightless environment. A core technology of the propellant tank is a propellant management device (abbreviated as PMD) inside the propellant tank. The management ability of the PMD is a key indicator for the performance of the propellant tank. An object of the PMD design is to allow the PMD to convey liquid reliably and without bubbles at any time.

Presently, the PMD of the propellant tank used in the spacecraft, especially in the satellite, is of a mesh-type, which employs screen meshes as capillary components to collect propellant, and employs pipelines to convey the propellant to a liquid outlet of the propellant tank. A limitation of such kind of propellant management devices is gradually shown, and has become an adverse factor limiting the development of the spacecraft industry. The mesh-type PMD has the following disadvantages, such as the capillary mesh has a low structural strength, is easy to be damaged and polluted, and has a low reliability; meanwhile, complicated fluid transport channels are required to be provided, which cause the propellant management device to have a large weight and a low filling speed.

According to the actual condition of orbital operations of the satellite, the propellant tank is not only required to store the propellant in various microgravity environments under a normal condition, but also required to store enough propellant to ensure enough liquid storage amount in extreme cases under various abnormal conditions, for example, in the case that a rotational angular velocity in Z direction (axial direction) is large or an opposite acceleration is large (such case may occur when the satellite rotates around X axis or Y axis), thus it is required to use a new-type liquid storage device, which has a simple structure, a high reliability, a large liquid storage amount, uses less screen mesh and is mainly of a plate structure.

The liquid storage devices are disclosed in different embodiments, and the liquid storage devices disclosed in patent applications No. U.S. Pat. No. 4,553,565A, No. DE10040755A1 and No. U.S. Pat. No. 4,976,398A can also be applied in the propellant tank. For example, a liquid storage device disclosed in the patent application No. U.S. Pat. No. 4,553,565A employs multiple blades uniformly arranged in a radial direction to realize liquid storage and gas-liquid separation, and the liquid storage device has the following disadvantages: the liquid storage amount is small, and it cannot provide enough liquid storage amount without bubbles under extreme cases which may occur (such as the rotational angular velocity of the propellant tank is large, the opposite acceleration is large or a lateral acceleration is large, and etc.). A spherical-crown-like liquid storage device is described in the patent application No. DE10040755A1, a cone-shaped plate is arranged in the liquid storage device, several screen mesh collectors and several guide vanes are arranged in proper areas according to the requirements of the orbital condition, and the liquid storage device has disadvantages of having a complicated structure, using many screen meshes, and having a small liquid storage amount. A liquid storage device is also described in the patent application No. U.S. Pat. No. 4,976,398A, which uses a cone-shaped structure area to store liquid, and has the following disadvantages: a lot of screen meshes are used, and a large amount of bubbles are apt to accumulate on the screen meshes in the liquid storage device; a flow rate of the liquid provided by the liquid storage device is small, and when the flow rate of liquid is set to be too large, the liquid flow inside the liquid storage device is apt to be cut off, which accelerates the accumulation of the bubbles on the screen meshes in the liquid storage device, and the worse case is that the gas will be pressed to pass through the screen meshes; and meanwhile it is not easy to fill and store enough liquid in the liquid storage device under the driving of the surface tension in microgravity environment.

SUMMARY

A technical issue to be addressed by the present application is to provide a liquid storage device for a propellant tank in a spacecraft to overcome deficiencies of the conventional technology, which has characteristics of a good performance, a simple structure, a high reliability, a large liquid storage amount and a strong application ability in microgravity environment, allowing liquid to be filled in and discharged from the liquid storage device repeatedly and circularly, a large liquid filling speed and a large liquid discharging speed, and allowing the propellant tank to be filled and discharged repeatedly on the ground.

Technical solutions of the present application are as follows.

A liquid storage device for a propellant tank in a spacecraft includes a gas-guide tube, a cover plate, a housing, blades, a supporting column, a base, a passage-window pressing plate, a passage-window mesh piece, a liquid-storage-device mesh piece, a fixing block, and a pressing plate for the liquid-storage-device mesh piece. The supporting column includes a center column, an upper supporting disk, and a lower supporting disk, the upper supporting disk and the lower supporting disk are coaxially connected by the center column, the upper supporting disk is located at a top end of the center column, the lower supporting disk is located at a lower portion of the center column, and a bottom end of the center column passes through the lower supporting disk; a plurality of mounting slots are radially distributed on both the upper supporting disk and the lower supporting disk of the supporting column, the mounting slots of the upper supporting disk are in one-to-one correspondence with the mounting slots of the lower supporting disk, one blade is inserted in each pair of the mounting slots in one-to-one correspondence, and each of the blades is fixedly connected to the mounting slots in which the blade is inserted. The base is of a cylinder-shaped structure having an upper opening and a lower opening, a circular partition plate with a plurality of through-holes is provided inside the base, a cylinder wall of the base below the circular partition plate is provided with a plurality of passage windows, the passage-window mesh piece is configured to cover an outer side of the cylinder wall of the base below the circular partition plate to cover all of the passage windows, and the passage-window pressing plate is configured to fix the passage-window mesh piece on the cylinder wall of the base. The liquid-storage-device mesh piece, and the pressing plate for the liquid-storage-device mesh piece are arranged in order on the circular partition plate inside the base, and the pressing plate for the liquid-storage-device mesh piece has a plurality of through-holes, and a periphery of the liquid-storage-device mesh piece and a periphery of the pressing plate for the liquid-storage-device mesh piece are both fixedly connected to the circular partition plate. The housing is of a truncated cone-shaped thin wall structure being opened at two ends, and an opening end with a small diameter of the housing is fixed at a top end of the base, a whole formed by the blades and the supporting column is arranged inside the housing, and the supporting column passes through a bottom end of the lower supporting disk to be fixedly connected to the circular partition plate of the base. The cover plate is fixed at an opening end with a large diameter of the housing to enclose the whole formed by the blades and the supporting column inside the housing, and the gas-guide tube is fixed on the cover plate by the fixing block and is configured to discharge gas inside an included angle space formed between the cover plate and the housing in a case that liquid is filled into the liquid storage device on the ground.

A plurality of through-holes are distributed on each of the blades and are configured to allow liquid to circulate inside the liquid storage device and between the blades and to capture gas, and a plurality of included angle areas are formed between the blades to guide and store the liquid.

A gap is provided between a periphery of each of the blades and the housing, a gap is provided between a periphery of each of the blades and the cover plate, and the gaps are configured to drive and guide the flow by liquid surface tension in a case that liquid is filled into the liquid storage device and to guide liquid outside the liquid storage device into the liquid storage device.

The gaps between the peripheries of the blades and the housing are in communication with the gaps between the peripheries of the blades and the cover plate.

There is no gap among the liquid-storage-device mesh piece, the pressing plate for the liquid-storage-device mesh piece and the circular partition plate inside the base, and the through-holes in the pressing plate for the liquid-storage-device mesh piece are in one-to-one correspondence with the through-holes in the circular partition plate.

The circular partition plate inside the base and the base are formed integrally.

The cover plate is of a rotating body thin wall structure, which has a side wall sunken into a middle axle of the cover plate and has an upper opening and a lower opening.

A height of the cover plate is greater than or equal to a half of a height of the housing, and a clearance is provided between an opening end with a small diameter of the cover plate and the upper supporting disk at the top end of the supporting column.

The passage-window mesh piece and the liquid-storage-device mesh piece are both made of a titanium alloys material.

Compared with the conventional technology, the liquid storage device according to the present application has the following advantageous effects.

1. Compared with the liquid storage devices disclosed in the patent applications U.S. Pat. No. 4,976,398A and No. DE10040755A1, the main structure of the liquid storage device according to the present application includes the cover plate, the housing, the base, and a whole structure (that is a small liquid storage device) consisting of the blades and the supporting column, the structure is simple; since the main structure is concentratedly distributed, the liquid storage device according to the present application has a high structural strength, and since the collector having a mesh piece and pipelines which are easy to be polluted in the patent applications No. U.S. Pat. No. 4,976,398A and No. DE10040755A1 are not used, the liquid storage device according to the present application has a high reliability.

2. Compared with the liquid storage device described in the patent application U.S. Pat. No. 4,553,565A, in the liquid storage device according to the present application, the cover plate has a rotating body thin wall structure having a side wall sunken into a middle axle of the cover plate, the housing has a truncated cone-shaped thin wall structure opened at two ends, an enclosed structure is formed by the cover plate and the housing, a built-in entire structure is also formed by the blades having through-holes and the supporting column, thus the liquid storage device according to the present application has a large liquid storage amount and a wide application range in the microgravity environment, and even under a few extreme working conditions that may occur, for example an axial rotation angular velocity of the propellant tank is large, an opposite acceleration is large, or a lateral acceleration is large, enough amount of liquid without gas can be ensured.

3. Compared with the liquid storage device described in the patent application U.S. Pat. No. 4,976,398A, the whole structure formed by the blades and the supporting column and fixed to the circular partition plate inside the base according to the present application may ensure that there is no gas directly accumulating on the liquid-storage-device mesh piece, thus may not affect the normal flow of liquid inside the liquid storage device, and ensure that the liquid can be reliably stored and discharged without bubbles under any working condition and at any time.

4. When the liquid in the liquid storage device is almost completely discharged out of the liquid storage device, an included angle gap between the blades, gaps between the blades and the cover plate, and gaps between the blades and the housing are used to fill, under the action of liquid surface tension, liquid into the liquid storage device from a liquid pool outside the liquid storage device in a short time via the passage windows, thereby ensuring that enough liquid is stored in the liquid storage device. Compared with the liquid storage devices described in the patent applications U.S. Pat. No. 4,976,398A and No. DE10040755A1, the liquid storage device according to the present application has a fast liquid filling speed and a large liquid filling amount.

5. Compared with the liquid storage devices described in the patent applications U.S. Pat. No. 4,976,398A and No. DE10040755A1, in the present application, the usage amount of the liquid-storage-device mesh piece and the passage-window mesh piece is less and the liquid-storage-device mesh piece and the passage-window mesh piece are concentratedly distributed, thus a fast liquid filling speed and a fast liquid discharging speed and the function of filling liquid repeatedly on the ground can be easily realized.

DETAILED DESCRIPTION

The present application is further described in detail in conjunction with accompany drawings and embodiments hereinafter.

Figure 1:
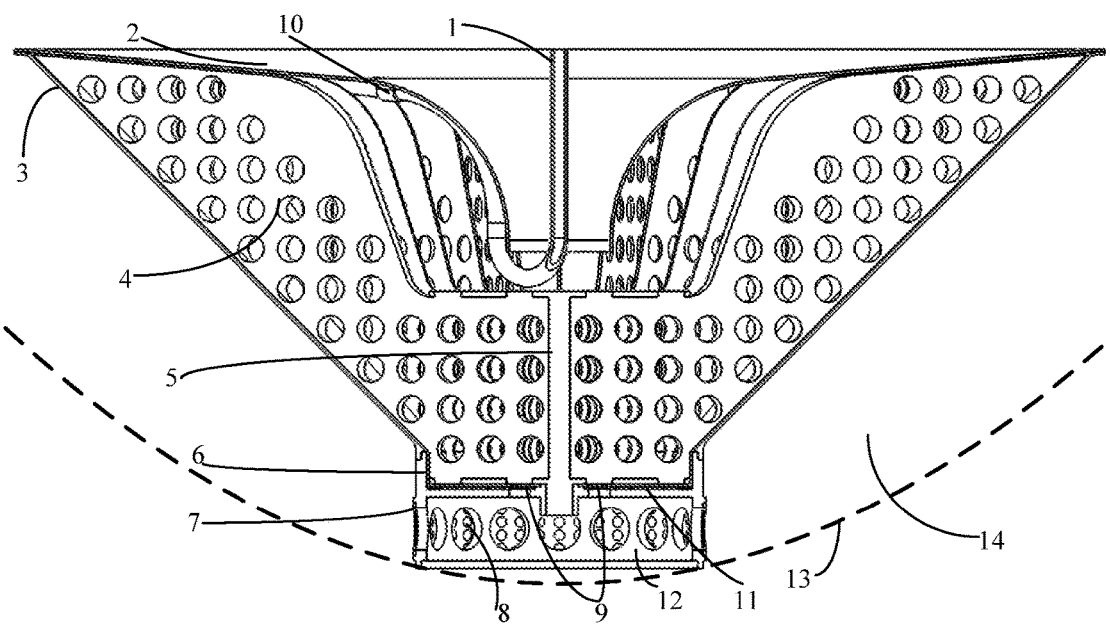
FIG. 1 is a sectional view of a liquid storage device according to the present application.
Figure 2:
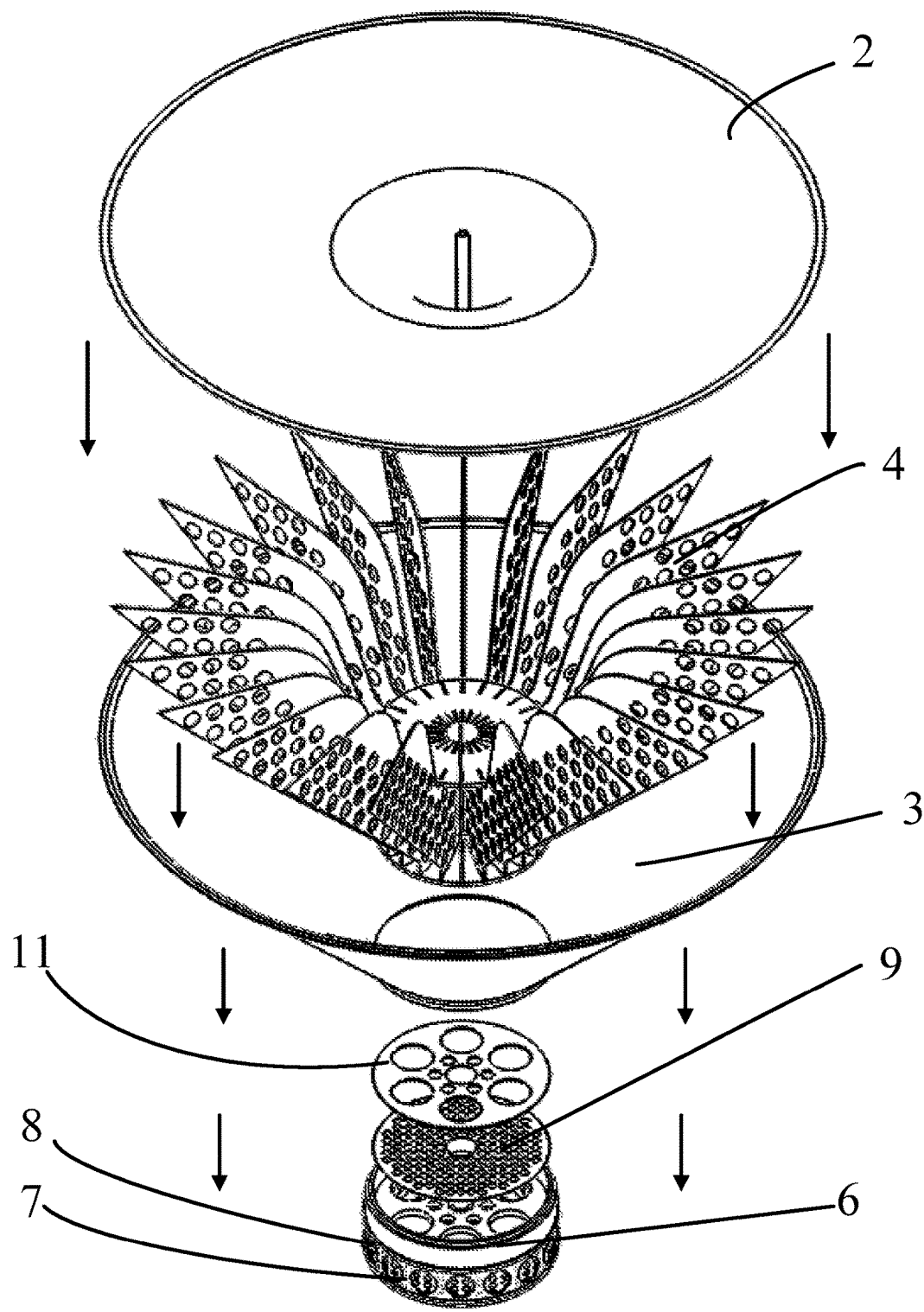
FIG. 2 is an exploded view of the liquid storage device according to the present application.

As shown in FIGS. 1 and 2, a liquid storage device for a propellant tank used in a spacecraft is provided according to the present application, which includes a gas-guide tube 1, a cover plate 2, a housing 3, blades 4, a supporting column 5, a base 6, a passage-window pressing plate 7, a passage-window mesh piece 8, a liquid-storage-device mesh piece 9, a fixing block 10 and a pressing plate 11 for the liquid-storage-device mesh piece. The passage-window mesh piece 8 and the liquid-storage-device mesh piece 9 are both made of a titanium alloys material.

Figure 6:
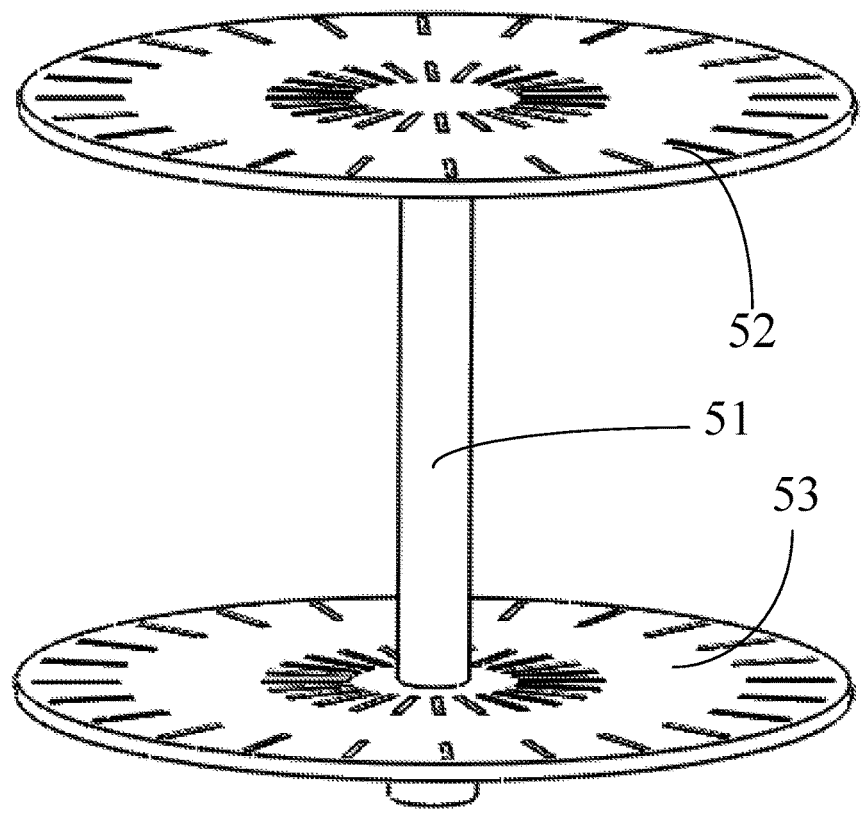
FIG. 6 is a schematic view showing the structure of a supporting column according to the present application.

As shown in FIG. 6, the supporting column 5 includes a center column 51, an upper supporting disk 52, and a lower supporting disk 53. The upper supporting disk 52 and the lower supporting disk 53 are coaxially connected via the center column 51, the upper supporting disk 52 is located at a top end of the center column 51, the lower supporting disk 53 is located at a lower portion of the center column 51, and a bottom end of the center column 51 passes through the lower supporting disk 53. Multiple mounting slots are radially distributed on both the upper supporting disk 52 and the lower supporting disk 53 of the supporting column 5, and the mounting slots of the upper supporting disk 52 are in one-to-one correspondence with the mounting slots of the lower supporting disk 53. One blade 4 is inserted in each pair of the mounting slots in one-to-one correspondence, and each of the blades 4 is fixedly connected to the mounting slots in which the blade 4 is inserted.

Multiple through-holes are distributed on each of the blades 4 and are configured to allow liquid to circulate inside the liquid storage device and between the blades 4 and capture gas. Multiple included angle areas are formed between the blades 4 to guide and store the liquid. Gaps exist between the peripheries of the blades 4 and the housing 3 and between the peripheries of the blades 4 and the cover plate 2, and are configured to drive and guide the flow by liquid surface tension when the liquid is filled into the liquid storage device, and to guide liquid outside the liquid storage device into the liquid storage device. The gaps between the peripheries of the blades 4 and the housing 3 are in communication with the gaps between the peripheries of the blades 4 and the cover plate 2.

Figure 7:
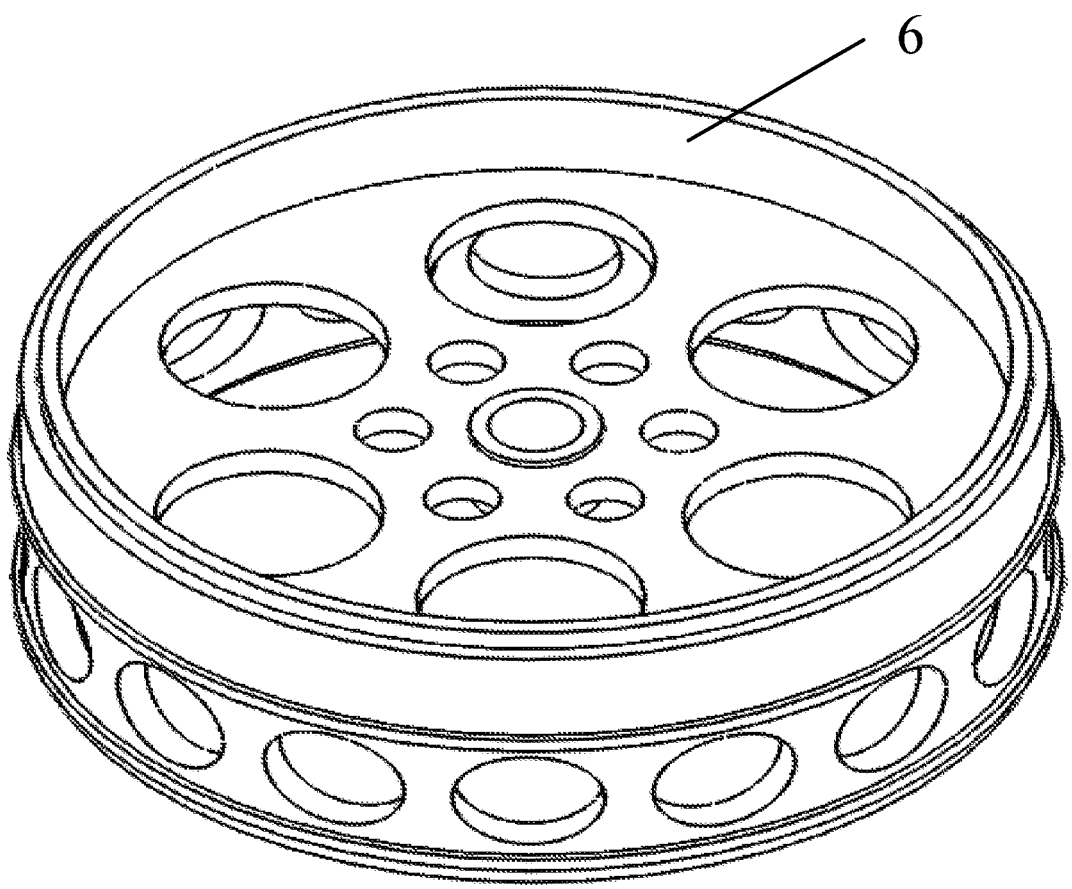
FIG. 7 is a schematic view showing the structure of a base according to the present application.

As shown in FIG. 7, the base 6 is of a cylinder-shaped structure having an upper opening and a lower opening, and a circular partition plate with multiple through-holes is provided inside the base 6, and the circular partition plate inside the base 6 and the base 6 are formed integrally.

A cylinder wall of the base 6 below the circular partition plate is provided with multiple passage windows, the passage-window mesh piece 8 covers the outer side of the cylinder wall of the base 6 below the circular partition plate to cover all of the passage windows, and the passage-window mesh piece 8 is fixed on the cylinder wall of the base 6 by the passage-window pressing plate 7.

Figure 8:
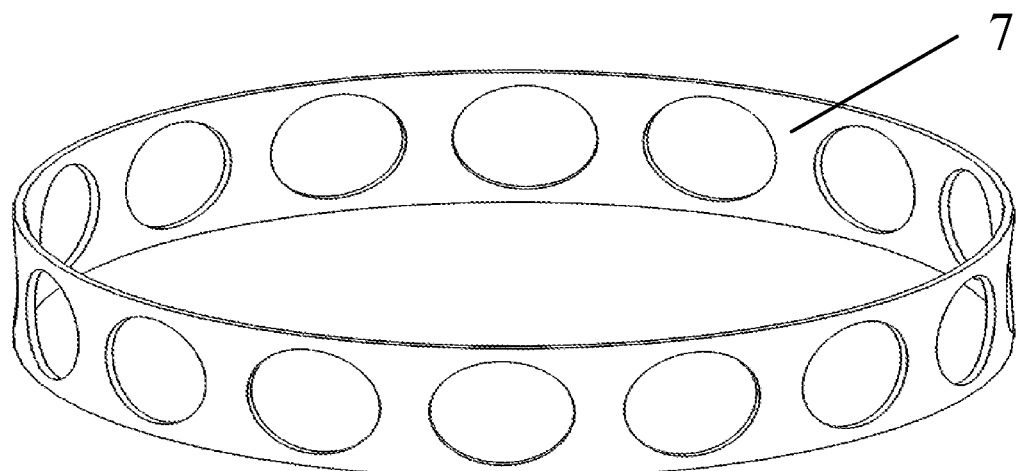
FIG. 8 is a schematic view showing the structure of a passage-window pressing plate according to the present application.

As shown in FIG. 8, the passage-window pressing plate 7 is of a cylinder-shaped thin wall structure having an upper opening and a lower opening, and multiple through-holes are provided in a side wall of the passage-window pressing plate 7. When the passage-window mesh piece 8 is fixed on the cylinder wall of the base 6 by the passage-window pressing plate 7, the through-holes in the passage-window pressing plate 7 are configured to be in one-to-one correspondence with the passage windows in the cylinder wall of the base 6 below the circular partition plate inside the base 6.

The liquid-storage-device mesh piece 9 and the pressing plate 11 for the liquid-storage-device mesh piece are arranged in order on the circular partition plate inside the base 6, and the pressing plate 11 for the liquid-storage-device mesh piece has multiple through-holes. A periphery of the liquid-storage-device mesh piece 9 and a periphery of the pressing plate 11 for the liquid-storage-device mesh piece are both fixedly connected to the circular partition plate. There is no gap among the liquid-storage-device mesh piece 9, the pressing plate 11 for the liquid-storage-device mesh piece and the circular partition plate inside the base 6, and the through-holes in the pressing plate 11 for the liquid-storage-device mesh piece are in one-to-one correspondence with the through-holes in the circular partition plate.

Figure 3:
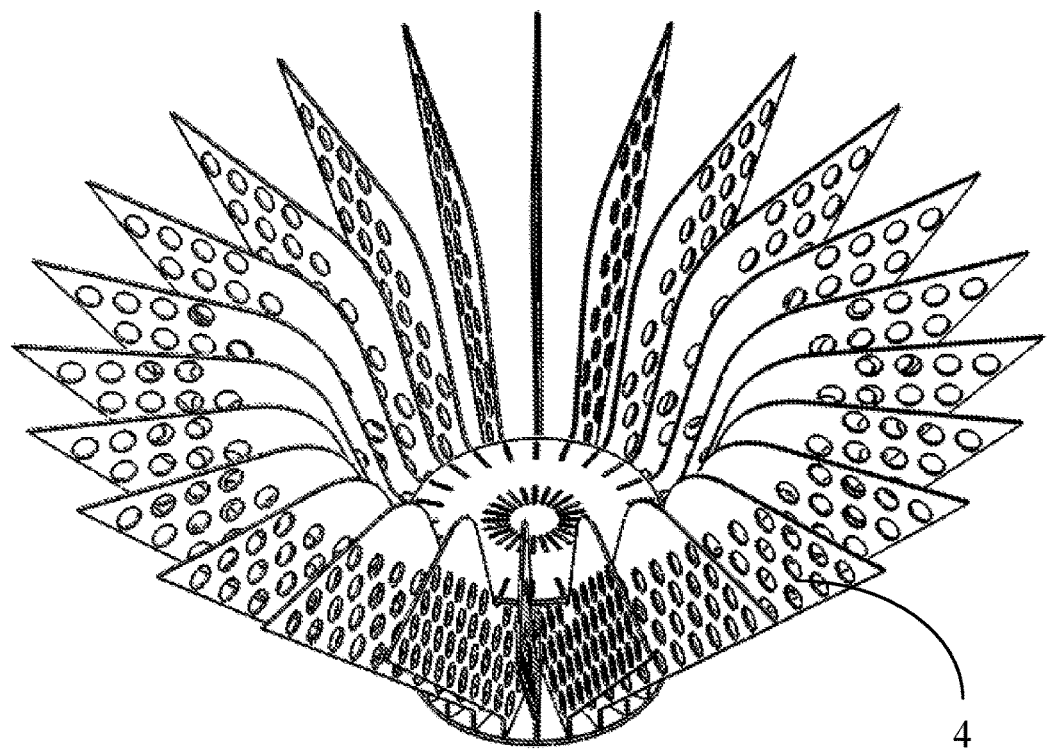
FIG. 3 is a schematic view showing the structure of a small liquid storage device according to the present application.

The housing 3 is of a truncated cone-shaped thin wall structure opened at two ends, and an opening end with a small diameter is fixed at a top end of the base 6, a whole formed by the blades 4 and the supporting column 5 is arranged inside the housing 3, and the supporting column 5 passes through a bottom end of the lower supporting disk 53 to be fixedly connected to the circular partition plate of the base 6. The whole formed by the blades 4 and the supporting column 5 is a small liquid storage device, which is shown in FIG. 3.

The cover plate 2 is fixed on an opening end with a large diameter of the housing 3 and configured to enclose the whole formed by the blades 4 and the supporting column 5 in the housing 3, and the gas-guide tube 1 is fixed on the cover plate 2 by the fixing block 10 and configured to discharge gas inside an included angle space 15 formed between the cover plate 2 and the housing 3 when the liquid storage device is being filled with liquid on the ground.

The cover plate 2 is of a rotating body thin-wall structure having a side wall sunken into a middle axle of the cover plate 2 and having an upper opening and a lower opening. The height of the cover plate 2 is greater than or equal to a half of the height of the housing 3, and a clearance exits between an opening end with a small diameter of the cover plate 2 and the upper supporting disk 52 at the top end of the supporting column 5.

The liquid storage device according to the present application is generally located at a liquid outlet of the propellant tank in the spacecraft, and employs the small liquid storage device, an included angle space 14 formed at the liquid outlet in the propellant tank between the housing 3 and an inner wall surface 13 of the propellant tank, and the included angle space 15 formed between the cover plate 2 and the housing 3, thereby effectively separating a driving gas and liquid and storing enough liquid without gas at the liquid outlet of the propellant tank. And also, a liquid pool 12 without bubbles is formed inside the base 6 by the liquid-storage-device mesh piece 8 and the passage-window mesh piece 9, the small liquid storage device can ensure that there is no gas directly accumulating on the liquid-storage-device mesh piece 9, thus may not affect the normal flow of the liquid inside the liquid storage device, and ensure that the liquid can be reliably stored and discharged without bubbles under any working condition and at any time.

With the included angle space 15 and the built-in small liquid storage device, the liquid storage device according to the present application realizes the functions of having a large liquid storage amount and a wide application range in the microgravity environment, thus even under a few extreme working conditions that may occur, for example an axial rotation angular velocity of the propellant tank is large, an opposite acceleration is large, or a lateral acceleration is large, enough amount of liquid without gas can be ensured, and the functions of repeatedly filling liquid into the liquid storage device and discharging liquid from the liquid storage device can be ensured.

Figure 4:
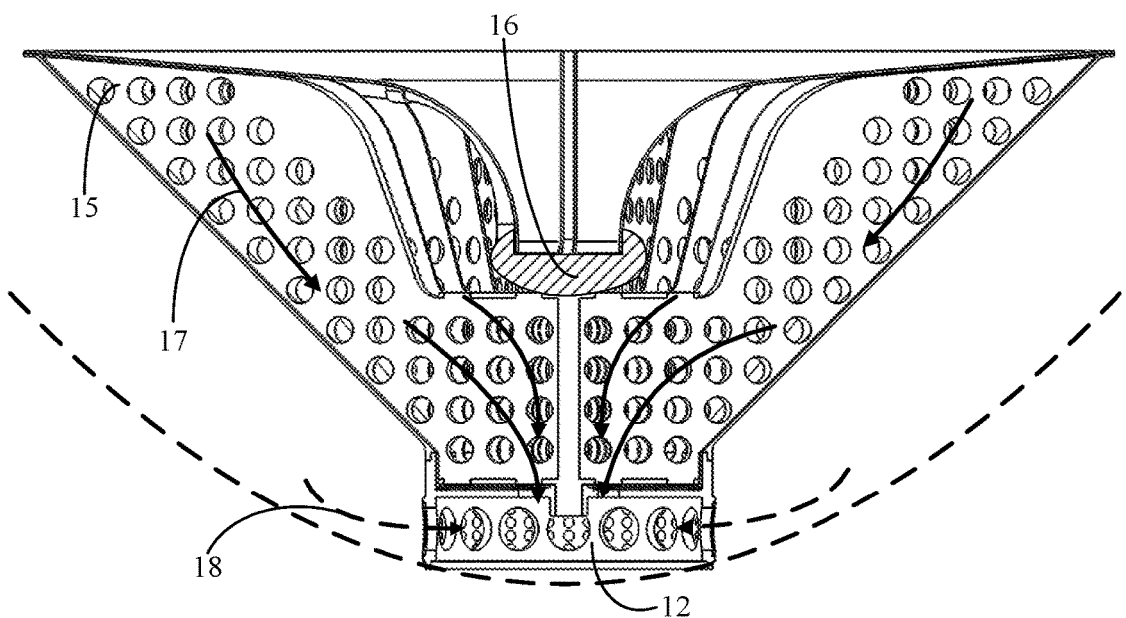
FIG. 4 is a schematic view showing a flow curve when the liquid storage device discharges liquid in a microgravity environment.

A flow curve when the liquid storage device is discharging liquid in a microgravity environment is shown in FIG. 4. In this state, the liquid storage device is substantially full of the liquid, and the driving gas is captured and accumulated at the opening end with a small diameter of the cover plate 2 above the small liquid storage device, to form a small gas chamber 16. The liquid stored inside the small liquid storage device flows through the liquid-storage-device mesh piece 9 under the action of the driving gas (the liquid flow is indicated by arrows 15) and enters the liquid pool 12. The liquid stored in the included angle space 15 flows, under the action of the surface tension, to a bottom of the small liquid storage device along the blades 4. With the decreasing of the liquid in the liquid storage device, the gas chamber 16 inside the liquid storage device is continually enlarged, and is firstly enlarged along an inner wall surface of the cover plate 2, and then is enlarged along the housing 3 and the blades 4 until the liquid in the liquid storage device is almost all discharged from the liquid storage device, and at this time, the gas chamber is changed into a gas chamber 19 of a shape shown in FIG. 5. At the same time, the liquid stored in the included angle space 14 formed at the liquid outlet of the propellant tank between the housing 3 of the liquid storage device and the inner wall surface 13 of the propellant tank flows through the passage-window mesh piece 8 under the action of the driving gas (the liquid flow is indicated by arrows 18) and enters the liquid pool 12.

Figure 5:
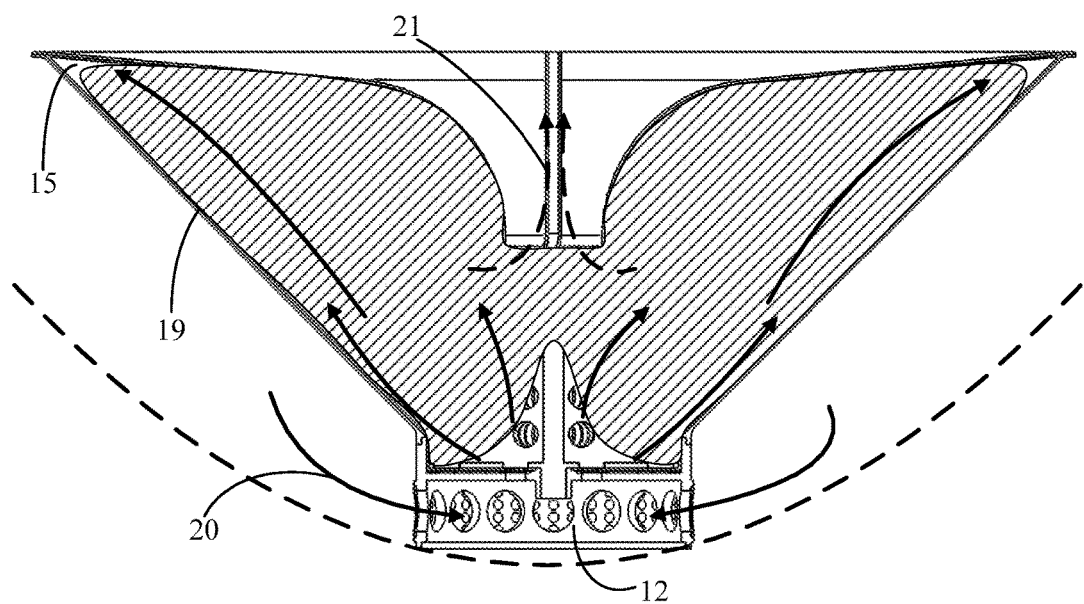
FIG. 5 is a schematic view showing a flow curve when liquid is filled into the liquid storage device in a microgravity environment.

A flow curve when liquid is filled into the liquid storage device in a microgravity environment is shown in FIG. 5. The liquid is substantially emptied out of the liquid storage device, the gas chamber 19 formed by the driving gas substantially occupies the entire inner cavity of the liquid storage device, and only a small amount of liquid is stored in a lower portion of the small liquid storage device and the included angle space 15 inside the liquid storage device. Under the action of the surface tension, the liquid stored in the included angle space 14 formed at the liquid outlet of the propellant tank between the housing 3 of the liquid storage device and the inner wall surface 13 of the propellant tank rapidly flows through the passage-window mesh piece 8 (the liquid flow is indicated by arrows 20), enters the liquid pool 12, and then flows through the liquid-storage-device mesh piece 9 to enter the small liquid storage device, and a part of the liquid passes through the blades 4 to continually fill liquid into the included angle space 15 inside the liquid storage device. While the liquid is filled into the liquid storage device, the gas inside the liquid storage device is squeezed out via the opening end with a small diameter of the cover plate 2 (the air flow is indicated by arrows 21), the gas chamber 19 is continually decreased, and the gas chamber 19 is substantially changed into the gas chamber 16 of the shape and size in FIG. 4 until the whole liquid storage device is substantially full of liquid.

When a practical liquid storage device is manufactured according to the structure of the liquid storage device provided in the present application, a volume of the liquid storage device may be 7.25 L, the maximum liquid storage amount is 7.2 L, an effective liquid storage amount is 6.98 L, it takes less than 720 s to fill the liquid storage device with liquid once in the microgravity environment, and the maximum liquid discharging velocity in a space environment with a lateral acceleration of one thousandth of the gravitational acceleration is not less than 12 ml/s.

The undisclosed technology in the present application belongs to the common general knowledge for those skilled in this field.

The invention claimed is:

1. A liquid storage device for a propellant tank in a spacecraft, comprising a gas-guide tube, a cover plate, a housing, blades, a supporting column, a base, a passage-window pressing plate, a passage-window mesh piece, a liquid-storage-device mesh piece, a fixing block, and a pressing plate for the liquid-storage-device mesh piece; wherein, the supporting column comprises a center column, an upper supporting disk, and a lower supporting disk, the upper supporting disk and the lower supporting disk are coaxially connected by the center column, the upper supporting disk is located at a top end of the center column, the lower supporting disk is located at a lower portion of the center column, and a bottom end of the center column passes through the lower supporting disk; a plurality of mounting slots are radially distributed on both the upper supporting disk and the lower supporting disk of the supporting column, the mounting slots of the upper supporting disk are in one-to-one correspondence with the mounting slots of the lower supporting disk, one blade is inserted in each pair of the mounting slots in one-to-one correspondence, and each of the blades is fixedly connected to the mounting slots in which the blade is inserted;

the base is a cylindrical structure having an upper opening and a lower opening, a circular partition plate with a plurality of through-holes is provided inside the base, a cylinder wall of the base below the circular partition plate is provided with a plurality of passage windows, the passage-window mesh piece is configured to cover an outer side of the cylinder wall of the base below the circular partition plate to cover all of the passage windows, and the passage-window pressing plate is configured to fix the passage-window mesh piece on the cylinder wall of the base;

the liquid-storage-device mesh piece, and the pressing plate for the liquid-storage-device mesh piece are arranged on the circular partition plate inside the base, and the pressing plate for the liquid-storage-device mesh piece is arranged above the liquid-storage-device mesh piece, and the pressing plate for the liquid-storage-device mesh piece has a plurality of through-holes, and a periphery of the liquid-storage-device mesh piece and a periphery of the pressing plate for the liquid-storage-device mesh piece are both fixedly connected to the circular partition plate;

the housing is in a shape of a truncated cone being opened at two ends, two opening ends of the housing comprises a first opening end and a second opening end, and a diameter of the first opening end is smaller than a diameter of the second opening end, and the first opening end of the housing is fixed at a top end of the base, an assembly of the blades and the supporting column is arranged inside the housing, and the supporting column passes through a bottom end of the lower supporting disk to be fixedly connected to the circular partition plate of the base; and the cover plate is fixed at the second opening end of the housing to enclose the whole formed by the blades and the supporting column inside the housing, and the gas-guide tube is fixed on the cover plate by the fixing block and is configured to discharge gas inside an included angle space formed between the cover plate and the housing in a case that liquid is filled into the liquid storage device on the ground.

2. The liquid storage device for the propellant tank in the spacecraft according to claim 1, wherein a plurality of through-holes are distributed on each of the blades and are configured to allow liquid to circulate inside the liquid storage device and between the blades and to capture gas, and a plurality of included angle areas are formed between the blades to guide and store the liquid.

3. The liquid storage device for the propellant tank in the spacecraft according to claim 1, wherein a gap is provided between a periphery of each of the blades and the housing, a gap is provided between a periphery of each of the blades and the cover plate, and the gaps are configured to drive and guide the flow by liquid surface tension in a case that liquid is filled into the liquid storage device and to guide liquid outside the liquid storage device into the liquid storage device.

4. The liquid storage device for the propellant tank in the spacecraft according to claim 3, wherein the gaps between the peripheries of the blades and the housing are in communication with the gaps between the peripheries of the blades and the cover plate.

5. The liquid storage device for the propellant tank in the spacecraft according to claim 1, wherein there is no gap among the liquid-storage-device mesh piece, the pressing plate for the liquid-storage-device mesh piece and the circular partition plate inside the base, and the through-holes in the pressing plate for the liquid-storage-device mesh piece are in one-to-one correspondence with the through-holes in the circular partition plate.

6. The liquid storage device for the propellant tank in the spacecraft according to claim 1, wherein the circular partition plate inside the base and the base are formed integrally.

7. The liquid storage device for the propellant tank in the spacecraft according to claim 1, wherein the cover plate is a solid of revolution, which has a side wall sunken into a middle axle of the cover plate and has an upper opening and a lower opening.

8. The liquid storage device for the propellant tank in the spacecraft according to claim 7, wherein a height of the cover plate is greater than or equal to a half of a height of the housing, and the cover plate comprises a first opening end and a second opening end, a diameter of the first opening end is smaller than a diameter of the second opening end, a clearance is provided between the first opening end of the cover plate and the upper supporting disk at the top end of the supporting column.

9. The liquid storage device for the propellant tank in the spacecraft according to claim 1, wherein the passage-window mesh piece and the liquid-storage-device mesh piece are both made of a titanium alloy material.

10. The liquid storage device for the propellant tank in the spacecraft according to claim 2, wherein a gap is provided between a periphery of each of the blades and the housing, a gap is provided between a periphery of each of the blades and the cover plate, and the gaps are configured to drive and guide the flow by liquid surface tension in a case that liquid is filled into the liquid storage device and to guide liquid outside the liquid storage device into the liquid storage device.

11. The liquid storage device for the propellant tank in the spacecraft according to claim 10, wherein the gaps between the peripheries of the blades and the housing are in communication with the gaps between the peripheries of the blades and the cover plate.

12. The liquid storage device for the propellant tank in the spacecraft according to claim 5, wherein the circular partition plate inside the base and the base are formed integrally.

* * * * *